(12) United States Patent
Yoo

(10) Patent No.: US 11,807,232 B2
(45) Date of Patent: Nov. 7, 2023

(54) METHOD AND APPARATUS FOR TRACKING AN OBJECT AND A RECORDING MEDIUM STORING A PROGRAM TO EXECUTE THE METHOD

(71) Applicants: HYUNDAI MOTOR COMPANY, Seoul (KR); KIA CORPORATION, Seoul (KR)

(72) Inventor: Min Kyun Yoo, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 196 days.

(21) Appl. No.: 17/463,681

(22) Filed: Sep. 1, 2021

(65) Prior Publication Data

US 2022/0203972 A1  Jun. 30, 2022

(30) Foreign Application Priority Data

Dec. 24, 2020 (KR) .................. 10-2020-0183557

(51) Int. Cl.
| | |
|---|---|
| *B60W 30/00* | (2006.01) |
| *B60W 30/095* | (2012.01) |
| *G06T 7/70* | (2017.01) |
| *B60W 40/04* | (2006.01) |

(52) U.S. Cl.
CPC .......... *B60W 30/095* (2013.01); *B60W 40/04* (2013.01); *G06T 7/70* (2017.01); *B60W 2420/52* (2013.01); *B60W 2554/803* (2020.02); *B60W 2554/804* (2020.02); *B60W 2554/806* (2020.02); *B60W 2556/10* (2020.02); *B60W 2754/70* (2020.02); *G06T 2207/10028* (2013.01); *G06T 2207/30252* (2013.01)

(58) Field of Classification Search
CPC ............... B60W 30/095; B60W 40/04; B60W 2556/10; B60W 2554/804; B60W 2554/803; B60W 2754/70; B60W 2554/806; B60W 2420/52; G06T 7/70; G06T 2207/10028; G06T 2207/30252
USPC ......................................................... 701/28
See application file for complete search history.

(56) References Cited

U.S. PATENT DOCUMENTS

| | | | |
|---|---|---|---|
| 2019/0370545 A1* | 12/2019 | Josephson | ............... G06T 15/06 |
| 2020/0132850 A1* | 4/2020 | Crouch | .................... G01S 17/34 |
| 2020/0272160 A1* | 8/2020 | Djuric | ....................... G06T 7/20 |

(Continued)

*Primary Examiner* — Tyler J Lee
*Assistant Examiner* — Tiffany P Ohman
(74) *Attorney, Agent, or Firm* — LEMPIA SUMMERFIELD KATZ LLC

(57) ABSTRACT

An object-tracking method includes using the velocity of a track for tracking an object, generated from a point cloud related to the object, in a current recognition period to obtain a current velocity-based heading angle of the track. The method includes accumulating scores associated with information about the current velocity-based heading angle and incorporating the accumulated scores into a heading history having regions sectioned for respective heading angles of the track. The method includes obtaining a history-based heading angle of the track using the heading history, correcting the history-based heading angle using information about the shape of the track, and determining the result of correction to be a final heading angle in the current recognition period.

19 Claims, 10 Drawing Sheets

(56) References Cited

U.S. PATENT DOCUMENTS

2020/0298891 A1* 9/2020 Liang .................. G05D 1/0088
2022/0146676 A1* 5/2022 Armstrong-Crews .......................
                                                      G01S 17/89

* cited by examiner

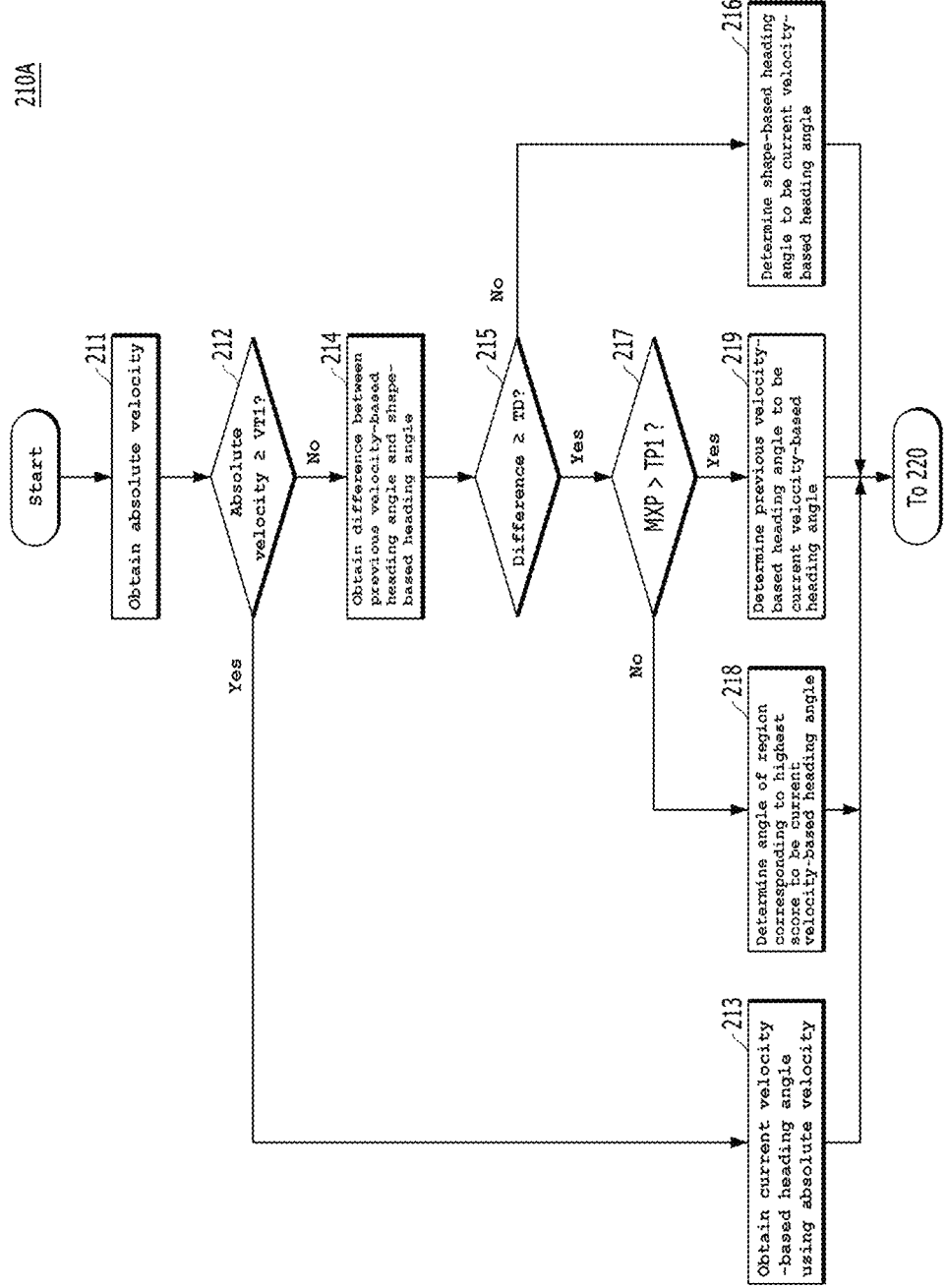

METHOD AND APPARATUS FOR TRACKING AN OBJECT AND A RECORDING MEDIUM STORING A PROGRAM TO EXECUTE THE METHOD

This application claims the benefit of priority to Korean Patent Application No. 10-2020-0183557, filed on Dec. 24, 2020, which is hereby incorporated by reference as if fully set forth herein.

BACKGROUND

Field of the Disclosure

The present disclosure relates to a method and apparatus for tracking an object and a recording medium storing a program to execute the method.

Discussion of the Related Art

The heading angle of a light detection and ranging (LiDAR) track with respect an object, which is generated from a point cloud related to the object acquired using a LiDAR sensor, may be obtained using a filter or the absolute velocity of the track.

However, the heading angle may be inaccurate in a specific situation. The heading angle, which is calculated based on the absolute velocity of a track, may be inaccurate in the situation in which the accuracy of the velocity is low, for example, in the situation in which the track moves at a low speed or during traffic congestion.

SUMMARY

Accordingly, the present disclosure is directed to a method and apparatus for tracking an object and a recording medium storing a program to execute the method that substantially obviate one or more problems due to limitations and disadvantages of the related art.

The present disclosure provides a method and apparatus for tracking an object and a recording medium storing a program to execute the method that enables tracking of an object using an accurate heading angle.

However, the objects to be accomplished by the present disclosure are not limited to the above-mentioned objects. Other objects not mentioned herein should be clearly understood by those having ordinary skill in the art from the following description.

An object-tracking method according to an embodiment may include (a) using the velocity of a track for tracking an object, generated from a point cloud related to the object, in a current recognition period (T) to obtain a current velocity-based heading angle of the track. The method may also include (b) accumulating scores associated with information about the current velocity-based heading angle and incorporating the accumulated scores into a heading history having regions sectioned for respective heading angles of the track. The method may further include (c) obtaining a history-based heading angle of the track using the heading history. The method may also include (d) correcting the history-based heading angle using information about the shape of the track and determining the result of correction to be a final heading angle in the current recognition period (T).

For example, step (a) may include obtaining an absolute velocity of the track in the current recognition period (T). Step (a) may also include, when the absolute velocity is greater than or equal to a first threshold velocity, obtaining the current velocity-based heading angle using an absolute longitudinal velocity and an absolute lateral velocity, which are components of the absolute velocity. Step (a) may further include, when the absolute velocity is less than the first threshold velocity, obtaining a difference between a previous velocity-based heading angle obtained using the velocity of the track in a previous recognition period (T−1) and a shape-based heading angle obtained using information about the shape of the track in the current recognition period (T). Step (a) may further include, when the difference is less than a threshold difference, determining the shape-based heading angle to be the current velocity-based heading angle. Step (a) may further include, when the difference is greater than or equal to the threshold difference, checking whether the highest score, among scores accumulated for each angle in the heading history, is greater than a first threshold score. Step (a) may further include, when the highest score is greater than the first threshold score, determining the previous velocity-based heading angle to be the current velocity-based heading angle. Step (a) may also include, when the highest score is less than or equal to the first threshold score, determining the angle of a region having the highest score, among regions in the heading history, to be the current, velocity-based heading angle.

For example, the absolute velocity may be obtained by summing the relative velocity of the track and the velocity of a host vehicle generating the point cloud. The current velocity-based heading angle may be obtained from the absolute longitudinal velocity and the absolute lateral velocity using an arctangent.

For example, step (b) may include obtaining a velocity ratio of a velocity having a smaller scalar value to a velocity having a larger scalar value, among the absolute longitudinal velocity and the absolute lateral velocity. Step (b) may also include checking whether the velocity ratio is less than a reference ratio. Step (b) may further include, when the velocity ratio is less than the reference ratio, decreasing the score of a target region corresponding to the current velocity-based heading angle, among regions in the heading history, by a first score, increasing the score by a second score, and increasing the score of each of a left region and a right region, respectively adjacent to the left and the right of the target region, by a third score. Step (b) may also include, when the velocity ratio is greater than or equal to the reference ratio, decreasing the score of the target region by a fourth score and increasing the score by a fifth score.

For example, each of the minimum value and the maximum value that can be accumulated in the heading history may be a fixed value.

For example, the incorporating the information into the heading history may be performed during every recognition period.

For example, the scores of regions in the heading history may be initialized when the track becomes extinct, i.e., expires, ends, or becomes obsolete.

For example, step (c) may include, when the highest score is less than or equal to a second threshold score, checking whether the absolute velocity is less than a second threshold velocity. Step (c) may also include, when the absolute velocity is greater than or equal to the second threshold velocity, determining the current velocity-based heading angle obtained in step (a) to be the history-based heading angle. Step (c) may further include, when the absolute velocity is less than the second threshold velocity, checking whether a spacing distance between a region in the heading history into which a score has been incorporated in the previous recognition period (T−1) and a region in the heading history into which a score has been incorporated in the current recognition period (T) is greater than a threshold distance. Step (c) may further include, when the spacing distance is greater than the threshold distance, determining the angle of a region having the highest score, among regions in the heading history, to be the history-based heading angle. Step (c) may further include, when the spacing distance is less than or equal to the threshold distance, determining the current velocity-based heading angle obtained in step (a) to be the history-based heading angle. Step (c) may further include, when the highest score is greater than the second threshold score and the spacing distance is greater than the threshold distance, determining the angle of a region corresponding to the highest score, among regions in the heading history, to be the history-based heading angle. Step (c) may also include, when the highest score is greater than the second threshold score and the spacing distance is less than or equal to the threshold distance, determining the current velocity-based heading angle obtained in step (a) to be the history-based heading angle.

For example, the heading history may include a plurality of regions and the number of the plurality of regions may be as follows.

$$N = \frac{360°}{x°}$$

Here, "N" represents the number of the plurality of regions and is a positive integer of 2 or more and "x°" represents the angular range of each of the plurality of regions.

For example, the angle of the region corresponding to the highest score may be an intermediate angle in the angular range of the region corresponding to the highest score.

For example, step (d) may include checking information about the shape of the track and correcting the history-based heading angle by comparing a plurality of candidate heading angles included in the information about the shape with the history-based heading angle.

For example, the correcting may include selecting a candidate heading angle having a small difference from the history-based heading angle from among the plurality of candidate heading angles.

For example, the correcting may further include filtering the candidate heading angle based on the reliability of the selected candidate heading angle.

For example, the filtering may include: checking whether the reliability is greater than a threshold reliability; when the reliability is not greater than the threshold reliability, determining the history-based heading angle to be the final heading angle; and, when the reliability is greater than the threshold reliability, determining the selected candidate heading angle to be the final heading angle.

An object-tracking apparatus according to another embodiment may include a track generation unit configured to generate a track for tracking an object from a point cloud related to the object. The apparatus may also include an angle calculation unit configured to calculate a current velocity-based heading angle of the track using the velocity of the track in the current recognition period (T). The apparatus may further include a history unit configured to accumulate scores associated with information about the current velocity-based heading angle and to incorporate the accumulated scores into a heading history having regions sectioned for respective heading angles of the track. The apparatus may further include an angle extraction unit configured to extract a history-based heading angle of the track using the heading history. The apparatus may also include an angle correction unit configured to correct the history-based heading angle using information about the shape of the track and to output the result of correction as a final heading angle in the current recognition period (T).

According to still another embodiment, a computer-readable recording medium in which a program for executing a method of tracking an object is recorded may store a program to implement a function of using the velocity of a track for tracking an object, generated from a point cloud related to the object, in the current recognition period (T) to obtain a current velocity-based heading angle of the track. The program may also implement a function of accumulating scores associated with information about the current velocity-based heading angle and incorporating the accumulated scores into a heading history having regions sectioned for respective heading angles of the track. The program may further implement a function of obtaining a history-based heading angle of the track using the heading history. The program may also implement a function of correcting the history-based heading angle using information about the shape of the track and determining the result or correction to be a final heading angle in the current recognition period (T).

BRIEF DESCRIPTION OF THE DRAWINGS

Arrangements and embodiments are described in detail with reference to the following drawings, in which like reference numerals refer to like elements and wherein:

FIG. 4 is a flowchart of an embodiment of step 210 shown in FIG. 2;

DETAILED DESCRIPTION OF THE INVENTION

The present, disclosure is now described mere fully hereinafter with reference to the accompanying drawings, in which various embodiments are shown. The examples, however, may be embodied in many different forms and should not be construed as being limited to the embodiments set forth herein. Rather, these embodiments are provided so that this disclosure is more thorough and complete and more fully conveys the scope of the disclosure to those having ordinary in the art.

It should be understood that when an element is referred to as being "on" or "under" another element, it may be directly on/under the element, or one or more intervening elements may also be present.

When an element is referred to as being "on" or "under", "under the element" as well as "on the element" may be included based on the element.

In addition, relational terms, such as "first", "second", "on/upper part/above" and "under/lower part/below", are used only to distinguish between one subject or element and another subject or element, without necessarily requiring or involving any physical or logical relationship or sequence between the subjects or elements. When a component, device, element, or the like of the present disclosure is described as having a purpose or performing an operation, function, or the like, the component, device, or element should be considered herein as being "configured to" meet that purpose or to perform that operation or function. The present disclosure describes various components of an object tracking apparatus as units, such as, but not limited to: a preprocessing unit; a clustering unit; a shape analysis unit; a segment unit; an object-tracking unit; a tracking unit; a tracking and classification unit; and an object-detecting unit. Each of the disclosed units may separately embody or be included with a processor and a memory, such as a non-transitory computer readable media, as part of the apparatus.

Hereinafter, an object-tracking apparatus according to an embodiment is described with reference to the accompanying drawings.

Figure 1:
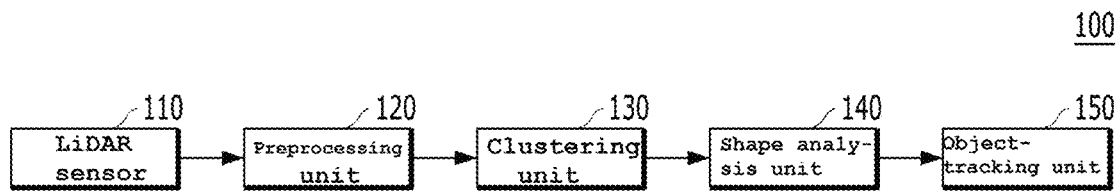
FIG. 1 is a schematic block diagram of an object-tracking apparatus according to an embodiment of the present disclosure.

FIG. 1 is a schematic block diagram of an object-tracking apparatus 100 according to an embodiment.

The object-tracking apparatus 100 may include a light detection and ranging (LiDAR) sensor 110, a preprocessing unit 120, a clustering unit 130, a shape analysis unit (or a segment unit) 140, and an object-tracking unit (a tracking unit, a tracking and classification unit, or an object-detecting unit) 150.

The LiDAR sensor 110 acquires a point cloud related to an object. For example, the LiDAR sensor 110 may radiate a single circular laser pulse having a wavelength of 905 nm to 1550 nm to an object and may measure the time taken for the laser pulse reflected from the object present within a measurement range to return. Thus, the LiDAR sensor 110 may sense information about the object, for example, the distance from the LiDAR sensor 110 to the object, the orientation of the object, the speed of the object, the temperature of the object, the material distribution of the object, and the concentration characteristics of the object. Here, the object may be, for example, another vehicle, a person, or an obstacle present, outside a vehicle in which the LiDAR sensor 110 is mounted (hereinafter referred to as a "host vehicle"). However, the embodiment is not limited to any specific type of object.

The preprocessing unit 120 may remove data related to reflection from the body of the host vehicle. In other words, since there is a region that is shielded by the body of the host vehicle depending on the mounting position and the field of view of the LiDAR sensor 110, the preprocessing unit 120 may remove data related to reflection from the body of the host vehicle using a reference coordinate system.

The preprocessing unit 120 may be omitted from the object-tracking apparatus 100 according to the embodiment.

The clustering unit 130 groups a point cloud, which is LiDAR data composed of a plurality of points related to the object acquired through the LiDAR sensor 110, into meaningful units according to a predetermined criterion. If the preprocessing unit 120 is not omitted, the clustering unit 130 may group the LiDAR data preprocessed by the preprocessing unit 120. For example, the clustering unit 130 may group the point cloud by applying a grid-based clustering method or a density-based clustering method thereto to perform clustering to generate the contour of the object. The result of sensing by the LiDAR sensor 110 shows a plurality of points, each of which has only information about a location (or coordinates). Therefore, the clustering unit 130 serves to group the plurality of points sensed by the LiDAR sensor 110 into units having meaningful shapes and to generate clusters, which are the result of grouping.

The shape analysis unit 140 may analyse the shape, which is the result of clustering by the clustering unit 130 and may output the result of analysis to the object-tracking unit 150.

The object-tracking unit 150 may generate a track based on the shape analysis result, may calculate the heading angle of the track, may track whether the object is an obstacle, a vehicle, or a person using the heading angle, and may recognize the same.

Hereinafter, an object-tracking method using the LiDAR sensor 110 according to an embodiment is described with reference to the accompanying drawings.

Figure 2:
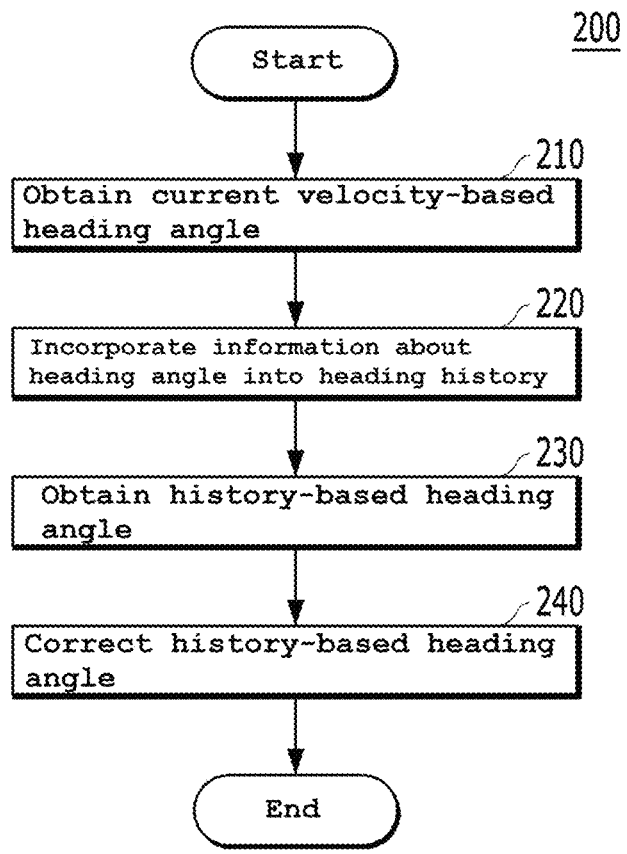
FIG. 2 is a flowchart of an object-tracking method according to an embodiment or the present disclosure.
Figure 3:
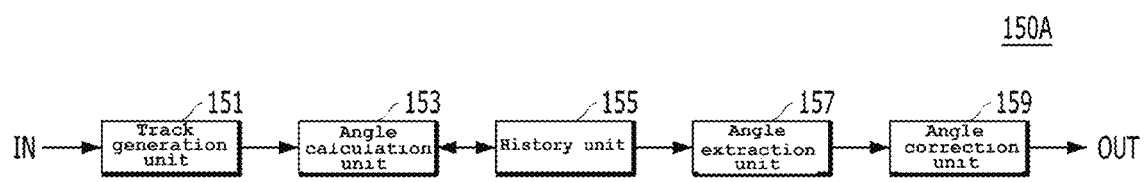
FIG. 3 is a block diagram of an embodiment of the object-tracking unit shown in FIG. 1.

FIG. 2 is a flowchart, of an object-tracking method 200 according to an embodiment. FIG. 3 is a block diagram of an embodiment 150A of the object-tracking unit 150 shown in FIG. 1.

The object-tracking unit 150A shown in FIG. 3 may include a track generation unit 151, an angle calculation unit 153, a history unit 155, an angle extraction unit 157, and an angle correction unit 159.

Although the object-tracking method 200 shown in FIG. 2 is described as being performed by the object-tracking unit 150A shown in FIG. 3, the embodiment is not limited thereto. In other words, according to another embodiment, the object-tracking method 200 shown in FIG. 2 may be performed by an object-tracking unit configured differently from the object-tracking unit 150A shown in FIG. 3. The object-tracking unit 150A shown in FIG. 3 may perform an object-tracking method configured differently from the object-tracking method 200 shown in FIG. 2. Further, the object-tracking unit 150A shown in FIG. 3 may also be applied to an object-tracking apparatus configured differently from the object-tracking apparatus 100 shown in FIG. 1.

First, the object-tracking apparatus 100 shown in FIG. 1 determines a final heading angle of the track during every recognition period. In other words, during every period (or step), the LiDAR sensor 110, the preprocessing unit 120, the clustering unit 130, the shape analysis unit 140, and the object-tracking unit 150 may operate to obtain the heading angle of the track of the object and may track the object using the same. In this way, the object-tracking apparatus 100 may determine the final heading angle of the track during every recognition period ( . . . , T−1, T, T+1, . . . ) Hereinafter, for convenience of description, "current recognition period" is denoted by "T" and "previous recognition period", which is immediately before the "current recognition period", is denoted by "T−1".

According to the method and apparatus for tracking an object according to the embodiments, it is possible to trace respective tracks of a plurality of objects during every recognition period. To this end, steps 210 to 240 shown in FIG. 2 may be performed on each of the tracks.

First, the heading angle of the track (hereinafter referred to as a "current velocity-based heading angle") is obtained using the velocity in the current recognition period T (hereinafter referred to as the "current velocity") of the track generated from the point cloud related to the object (step 210).

For example, step 210 may be performed by the track generation unit 151 and the angle calculation unit 153 shown in FIG. 3.

The track generation unit 151 may generate a track from the point cloud related to the object in order to track the object. For example, the track generation unit 151 may receive the result of analysis by the shape analysis unit 140 through an input terminal IN and may generate a track for tracking the object using the same.

The angle calculation unit 153 may calculate the current velocity-based heading angle of the track using the current velocity of the track generated by the track generation unit 151 and may output the calculated current velocity-based heading angle to the history unit 155.

Figure 5A:
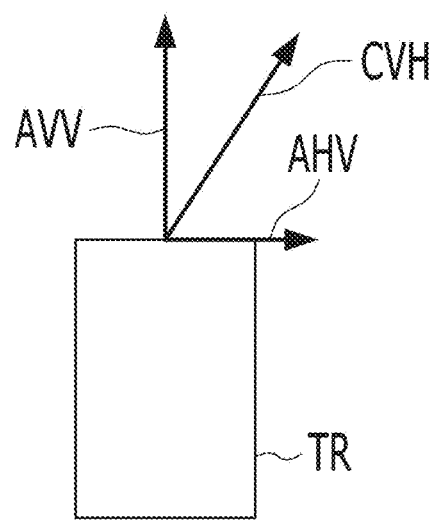
FIGS. 5A and 5B are diagrams for explaining step 210A shown in FIG. 4.
Figure 5B:
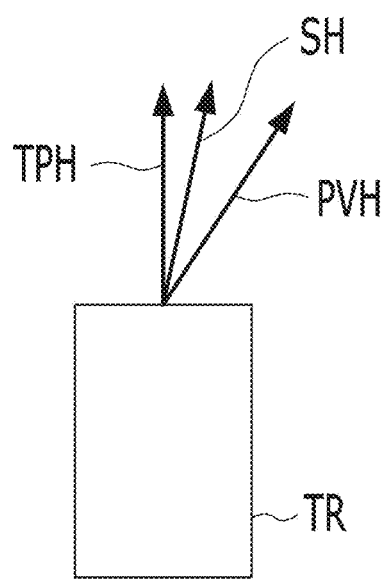

FIG. 4 is a flowchart of an embodiment 210A of step 210 shown in FIG. 2. FIGS. 5A and 5B are diagrams for explaining step 210A shown in FIG. 4.

For example, step 210A shown in FIG. 4 may be performed by the angle calculation unit 153 shown in FIG. 3.

First, the absolute velocity of the track in the current recognition period T is obtained (step 211). For example, the absolute velocity AV of the track may be obtained by summing the relative velocity TCV of the track and the velocity SW of the host vehicle, as expressed using Equation 1 below.

$$AV=TCV+SVV \quad \text{[Equation 1]}$$

Here, as described above, the host vehicle is a vehicle equipped with the LiDAR sensor 110.

After step 211, whether the absolute velocity AV is greater than or equal to a first threshold velocity VT1 is checked (step 212). Here, the first threshold velocity VT1 may be a value set in advance differently for each track or may be a fixed value set in advance regardless of the track. The embodiment is not limited to any specific value of the first threshold velocity VT1.

If the absolute velocity AV is greater than or equal to the first threshold velocity VT1, as shown in FIG. 5A, the current velocity-based heading angle CVH may be obtained using the absolute longitudinal velocity AVV and the absolute lateral velocity AHV, which are components of the absolute velocity AV of the track TR (step 213). For example, the current velocity-based heading angle CVH may be obtained from the absolute longitudinal velocity AVV and the absolute lateral velocity AHV using an arctangent, but the embodiment is not limited thereto.

However, if the absolute velocity AV is less than the first threshold velocity VT1, a difference between a previous velocity-based heading angle and a shape-based heading angle is obtained (step 214). Here, the previous velocity-based heading angle is a heading angle obtained using the velocity of the track in the previous recognition period T−1. The shape-based heading angle is a heading angle obtained using information about the shape of the track TR in the current recognition period T.

After step 214, whether the difference between the previous velocity-based heading angle and the shape-based heading angle is greater than or equal to a threshold difference TD is checked (step 215). Here, the threshold difference TD may be a value set in advance differently for each track TR or may be a fixed value set in advance regardless of the track TR. The embodiment is not limited to any specific value of the threshold difference TD.

If the difference between the previous velocity-based heading angle and the shape-based heading angle is less than the threshold difference TD, the shape-based heading angle is determined to be the current velocity-based heading angle (step 216). For example, the shape-based heading angle SH shown in FIG. 5B may be determined to be the current velocity-based heading angle.

However, if the difference between the previous velocity-based heading angle and the shape-based heading angle is greater than or equal to the threshold difference TD, whether the highest score MXP, among the scores accumulated for each heading angle in a heading history, which is described below, is greater than a first threshold score TP1 is checked (step 217). Here, the first threshold score TP1 may be a value set in advance differently for each track TR or may be a fixed value set in advance regardless of the track TR. The embodiment is not limited to any specific value of the first threshold score TP1.

Hereinafter, the heading history is described with reference to the accompanying drawings.

Figure 6:
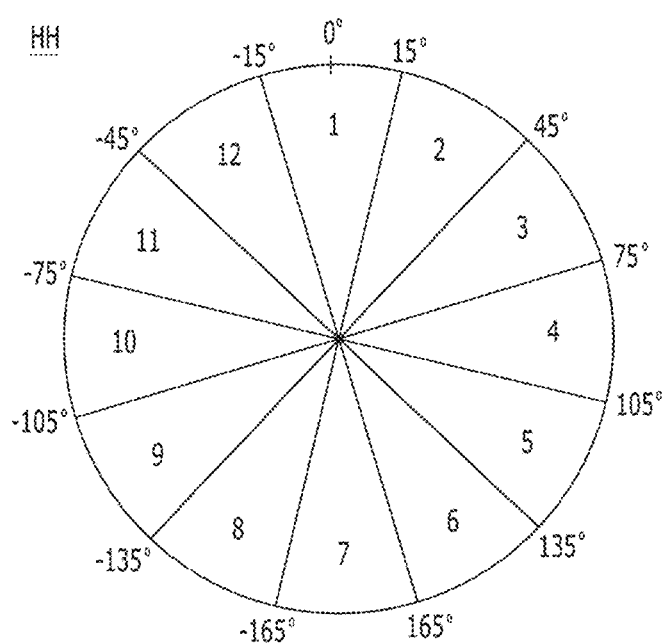
FIG. 6 is a diagram illustrating a heading history.

FIG. 6 is a diagram illustrating the heading history HH.

According to the embodiment, the heading history may include a plurality of regions, the number of which is calculated using Equation 2 below.

$$N = \frac{360°}{x°} \quad \text{[Equation 2]}$$

Here, "N" represents the number of regions that are sectioned for respective heading angles of the track TR included in the heading history HH and is a positive integer of 2 or more. Also, "x°" represents the angular range of each of the regions included in the heading history HH.

For example, when x° is 30°, as shown in FIG. 6, the number N of regions included in the heading history HH may be 12. In other words, the heading history HH shown in FIG. 6 may include first to twelfth regions 1 to 12. In this case, the angular range of the first region 1 is −15° to +15° The angular range of the second region 2 is +15° to +45°. The angular range of the third region 3 is +45° to +75°. The angular range of the fourth region 4 is +75° to +105°. The angular range of the fifth region 5 is +105° to +135°. The angular range of the sixth region 6 is +135° to +165°. The angular range of the seventh region 7 is +165° to −165°. The angular range of the eighth region 8 is −165° to −135°. The angular range of the ninth region 9 is −135° to −105°. The angular range of the tenth region 10 is −105° to −75°. The angular range of the eleventh region 11 is −75° to −45°. The angular range of the twelfth region 12 is −45° to −15°.

Each of the first to $N^{th}$ regions included in the heading history HH illustrated in FIG. 6 may have a cumulative score. The process of accumulating scores for each of the plurality of regions is described below with reference to FIG. 7.

The highest score XMP used in step 217 is the highest score among the cumulative scores of the first to $N^{th}$ regions included in the heading history HH. Hereinafter, the region having the highest cumulative score among the first to $N^{th}$ regions included in the heading history HH is referred to as a "highest region".

If the highest score MXP is less than or equal to the first threshold score TP1, the angle TPH of the highest region is determined to be the current velocity-based heading angle, as shown in FIG. 5B (step 218). In this case, the angle of the highest region, which is determined to be the current velocity-based heading angle, may be one of the angles falling within the angular range of the highest region.

According to an embodiment, the angle of the highest region, which is determined to be the current velocity-based heading angle, may be an intermediate angle in the angular range of the highest region. For example, when the cumulative score of the first region 1 is the highest score, which is greater than the cumulative scores of the second to twelfth regions 2 to 12, among the first to twelfth regions 1 to 12 included in the heading history HH shown in FIG. 6, the first region 1 corresponds to the highest region. In this case, the intermediate angle in the angular range (−15° to +15°) of the first region 1 is 0°, which is the highest region, and 0° is determined to be the current velocity-based heading angle.

However, when the highest score MXP is greater than the first threshold score TP1, the previous velocity-based heading angle PVH shown in FIG. 5B may be determined to be the current velocity-based heading angle (step 219).

Meanwhile, referring again to FIG. 2, after step 210, the history unit 155 may accumulate scores associated with information about the current velocity-based heading angle and may incorporate the accumulated scores into the heading history (step 220).

Figure 7:
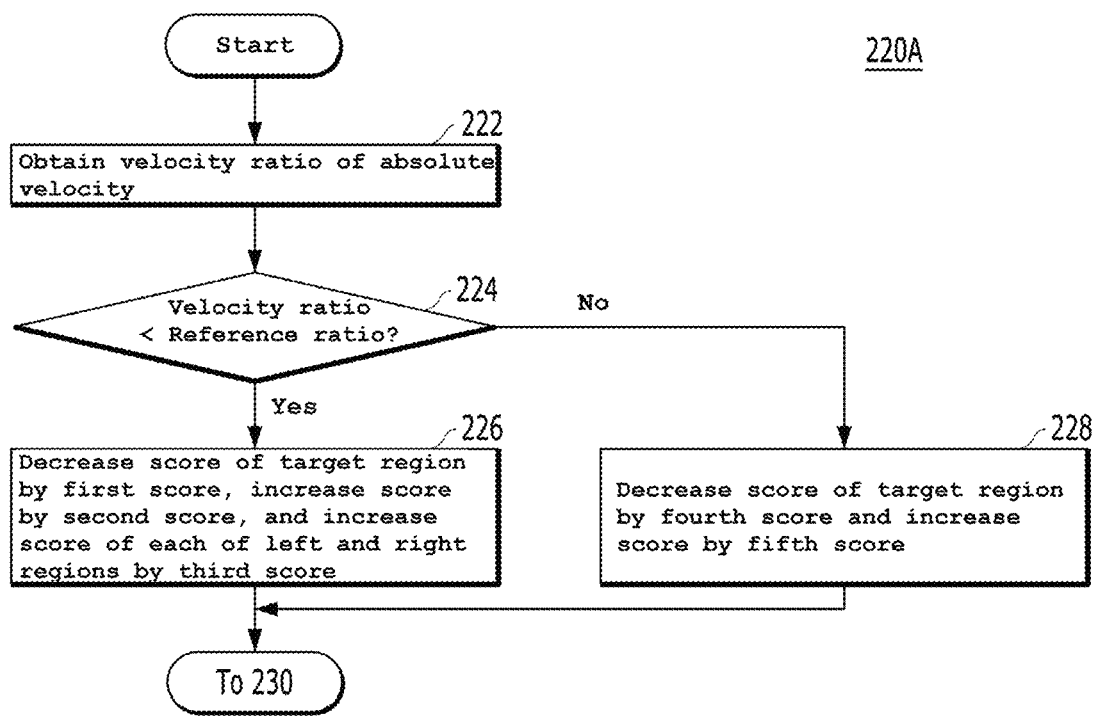
FIG. 7 is a flowchart of an embodiment of step 220 shown in FIG. 2.

FIG. 7 is a flowchart, of an embodiment 220A of step 220 shown in FIG. 2. Step 220A shown in FIG. 7 may be performed by the history unit 155 shown in FIG. 3.

After step 210, a velocity ratio of the velocity having a smaller scalar value, among the absolute longitudinal velocity and the absolute lateral velocity, to the velocity having a larger scalar value is obtained (step 222). The velocity ratio may be expressed using Equation 3 below.

$$VR = \frac{VMI}{VMA} \quad \text{[Equation 3]}$$

Here, "VR" represents the velocity ratio, "VMA" represents the velocity having a larger scalar value, among the absolute longitudinal velocity and the absolute lateral velocity. "VMI" represents the velocity having a smaller scalar value, among the absolute longitudinal velocity and the absolute lateral velocity.

After step 222, whether the velocity ratio VR is less than a reference ratio is checked (step 224). Here, the reference ratio may be a value set in advance differently for each track TR or may be a fixed value set in advance regardless of the track TR. The embodiment is not limited to any specific value of the reference ratio.

Depending on the result of inspection in step 224, scores with respect to each of a target region, a left region, and a right region in the heading history may be accumulated as follows (steps 226 and 228). Here, the target region is a region corresponding to the current velocity-based heading angle obtained in step 210, among the first to $N^{th}$ regions in the heading history HH. The left region is a region adjacent to, and to the left of, the target region among the first to $N^{th}$ regions. The right region is a region adjacent to, and to the right of, the target region among the first to $N^{th}$ regions. For example, when the current velocity-based heading angle obtained in step 210 is 40°, among the first to twelfth regions 1 to 12 shown in FIG. 6, the second region 2 is the target region, the first region 1 is the left region, and the third region 3 is the right region.

If the velocity ratio VR is less than the reference ratio, the score of the target region is decreased by a first score and increased by a second score and the score of each of the left region and the right region is increased by a third score (step 226). However, if the velocity ratio VR is greater than or equal to the reference ratio, the score of the target region is decreased by a fourth score and increased by a fifth score (step 228).

For example, in order to help understand steps 226 and 228, it is assumed that the first score is 0.5, the second score is 2, and each of the reference ratio, the third score, the fourth score, and the fifth score is 0.25.

In this case, the score of the target region is decreased as follows.

If the velocity ratio is less than 0.25 (=reference ratio), the score of the target region is decreased by 0.5 (=first score). If the velocity ratio is greater than or equal to 0.25 (=reference ratio), the score of the target region is decreased by 0.25 (=fourth score).

In addition, the score of the target region is increased as follows.

If the velocity ratio is less than 0.25 (=reference ratio), the score of the target region is increased by 2 (=second score) and the score of each of the left region and the right region is increased by 0.25 (=third score). If the velocity ratio is greater than or equal to 0.25 (=reference ratio), the score of the target region is increased by 0.25 (=fifth score).

For better understanding, assuming that the first to fifth scores are as described above, for example, when the current velocity-based heading angle obtained at the tenth step in the current recognition period T is 5°, when the previous velocity-based heading angle obtained at the tenth step in the previous recognition period T−1 is also 5°, and when the first region among the regions in the heading history is the target region, scores to be assigned to the first region, the twelfth region, and the second region may be calculated as expressed using Equation 4 below.

$A1$=2 points−(0.5 points or 0.25 points)+2 points $A12$=0.25 points−(0.5 points or 0.25 points)+0.25 points $A2$=0.25 points−(0.5 points or 0.25 points)+0.25 points        [Equation 4]

Here, "A1" represents a score accumulated in the first region, "A12" represents a score accumulated in the twelfth region, and "A2" represents a score accumulated in the second region.

As described above, according to the embodiment, similar to a pseudo Gaussian function, when scores are assigned to and accumulated in the regions included in the heading history, it is possible to obtain an effect in which a probability-based Gaussian function is accumulated.

Further, according to the embodiment, each of the minimum value and the maximum value that may be accumulated in the heading history may be a fixed value. For example, when the minimum value that may be accumulated in the heading history is 0, the smallest value that may be accumulated in each of the first to $N^{th}$ regions included in the heading history may not be less than 0. As such, the minimum value is the minimal limit value of the accumulated scores. Further, when the maximum value that may be accumulated in the heading history is 10, the largest value that may be accumulated in each of the first to $N^{th}$ regions included in the heading history may not be greater than 10. As such, the maximum value is the maximal limit value of the accumulated scores.

Furthermore, step 220 (or step 220A) of incorporating information into the heading history may be performed during every recognition period ( . . . , T−1, T, T+1, . . . ).

The heading history HH illustrated in FIG. 6 may be present for each of a plurality of tracks. Considering this, when an object tracked by the object-tracking method and apparatus according to the embodiments disappears and the track related to the disappeared object becomes extinct, i.e., expires, ends, or is obsolete, the scores of regions in a heading history corresponding to the extinct or obsolete track may be initialized. In other words, the heading history corresponding to the extinct track may be deleted. Conversely, when a new object, which is to be tracked by the object-tracking method and apparatus according to the embodiments, appears, a track related to the newly appeared object may be generated and accumulation of scores in each of the regions in a heading history may be started. In other words, a heading history related to a newly generated track may be generated.

Referring again to FIG. 2, after step 220, the angle extraction unit 157 extracts a heading angle of the track (hereinafter referred to as a "history-based heading angle") using the heading history HH and outputs the extracted history-based heading angle to the angle correction unit 159 (step 230).

Figure 8:
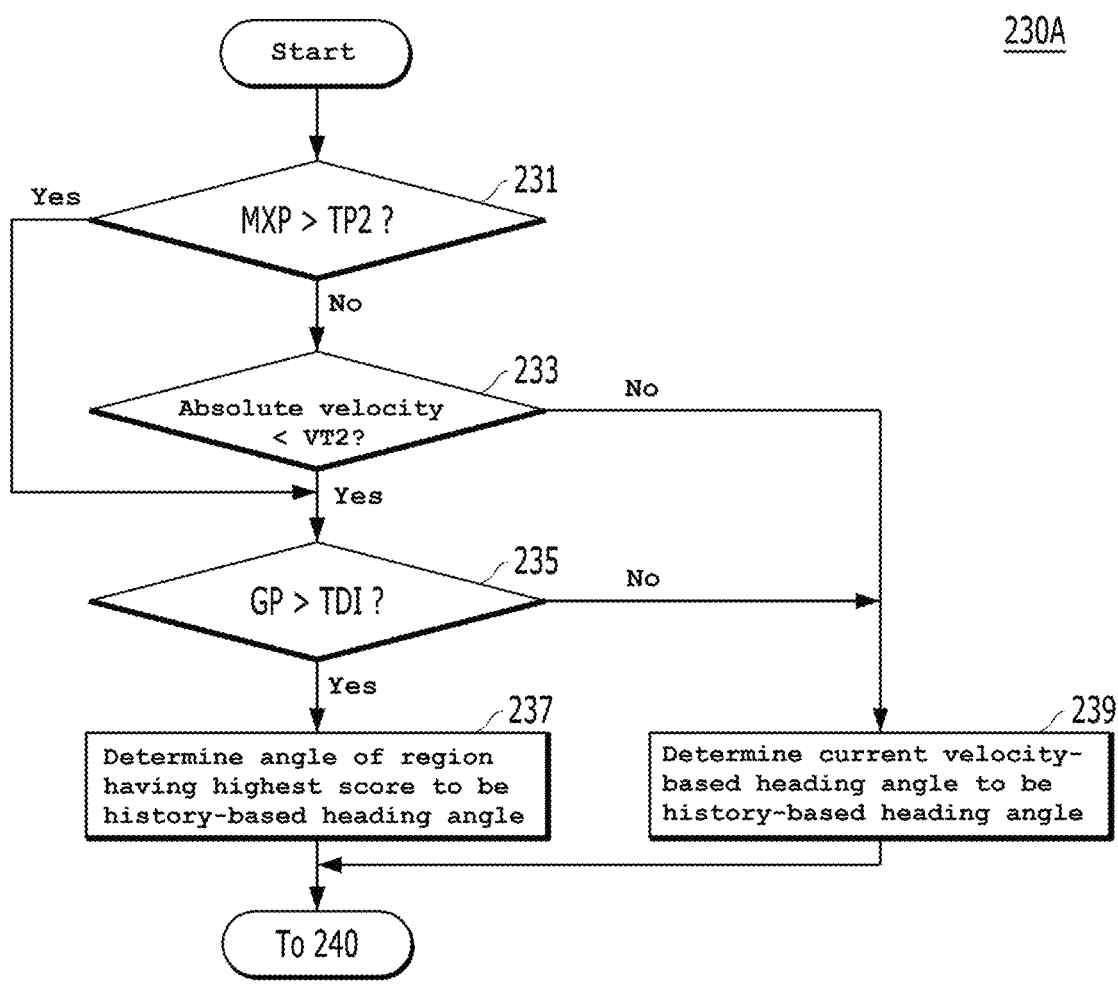
FIG. 8 is a flowchart of an embodiment of step 230 shown in FIG. 2.

FIG. 8 is a flowchart of an embodiment 230A of step 230 shown in FIG. 2. Step 230A shown in FIG. 8 may be performed by the angle extraction unit 157.

After step 220, whether the highest score MXP, among the scores accumulated in the first to $N^{th}$ regions in the heading history HH, is greater than a second threshold score TP2 is checked (step 231). Here, the second threshold score TP2 may be a value set in advance differently for each track or may be a fixed value set in advance regardless of the track. For example, the second threshold score TP2 may be 4 points, but the embodiment is not limited to any specific value of the second threshold score TP2.

If the highest score MXP is less than or equal to the second threshold score TP2, whether the absolute velocity is less than the second threshold velocity VT2 is checked (step 233). Here, the second threshold velocity VT2 may be a value set in advance differently for each track or may be a fixed value set in advance regardless of the track. For example, the second threshold velocity VT2 may be 1.5 m/s, but the embodiment is not limited to any specific value of the second threshold velocity VT2.

If the absolute velocity is greater than or equal to the second threshold velocity VT2, the current velocity-based heading angle obtained in step 210 is determined to be the history-based heading angle (step 239). However, if the absolute velocity is less than the second threshold velocity VT2, whether a spacing distance GP between a region in the heading history HH into which a score has been incorporated in the previous recognition period T−1 (hereinafter referred to as a "previous region") and a region in the heading history HH into which a score has been incorporated in the current recognition period T (hereinafter referred to as a "current region") is greater than a threshold distance TDI is checked (step 235). Here, the threshold distance TDI may be a value set in advance differently for each track or may be a fixed value set in advance regardless of the track.

Further, the spacing distance GP may correspond to a spacing distance between the target region in the previous recognition period T−1 and the target region in the current recognition period T, among the regions in the heading history. For example, when the target region in the previous recognition period T−1 is the $n^{th}$ region and the target region in the current recognition period T is the $m^{th}$ region, among the first to $N^{th}$ regions included in the heading history HH, the spacing distance GP may be expressed using Equation 5 below.

$$GP=|m-n| \quad \text{[Equation 5]}$$

Here, $1 \leq n \leq N$, and $1 \leq m \leq N$.

For example, when the spacing distance GP is as expressed using Equation 5 above, the threshold distance TDI may be determined to 1.

If the spacing distance GP is greater than the threshold distance TDI, the angle of the highest region, which has the highest score, is determined to be the history-based heading angle (step 237). According to the embodiment, the angle of the highest region, which is determined to be the history-based heading angle in step 237, may be an intermediate angle in the angular range of the highest region. For example, when the cumulative score of the first region 1 is the highest score, which is greater than the cumulative scores of the second to twelfth regions 2 to 12, among the first to twelfth regions 1 to 12 included in the heading history HH shown in FIG. 6, the first region 1 corresponds to the highest region. In this case, the intermediate angle in the angular range (−15° to +15°) of the first region 1, which is the highest region, is 0° and 0° is determined to be the history-based heading angle.

However, if the spacing distance GP is less than or equal to the threshold distance TDI, the current velocity-based heading angle obtained in step 210 may be determined to be the history-based heading angle (step 239).

On the other hand, when it is determined in step 231 that the highest score MXP is greater than the second threshold score TP2, the process goes to step 235. In other words, when the highest score MXP is greater than the second threshold score TP2 and the spacing distance GP is greater than the threshold distance TDI, step 237 described above is performed. In step 237, the angle of the highest region corresponding to the highest score, among the regions in the heading history, is determined to be the history-based heading angle. However, when the highest score MXP is greater than the second threshold score TP2 and the spacing distance GP is less than or equal to the threshold distance TDI, step 239 is performed. In step 239, the current velocity-based heading angle obtained in step 210 is determined to be the history-based heading angle.

Meanwhile, referring again to FIG. 2, the angle correction unit 159 corrects the history-based heading angle using information about the shape of the track, determines the result of correction to a final heading angle in the current recognition period T, and outputs the final heading angle through an output terminal OUT (step 240).

Figure 9:
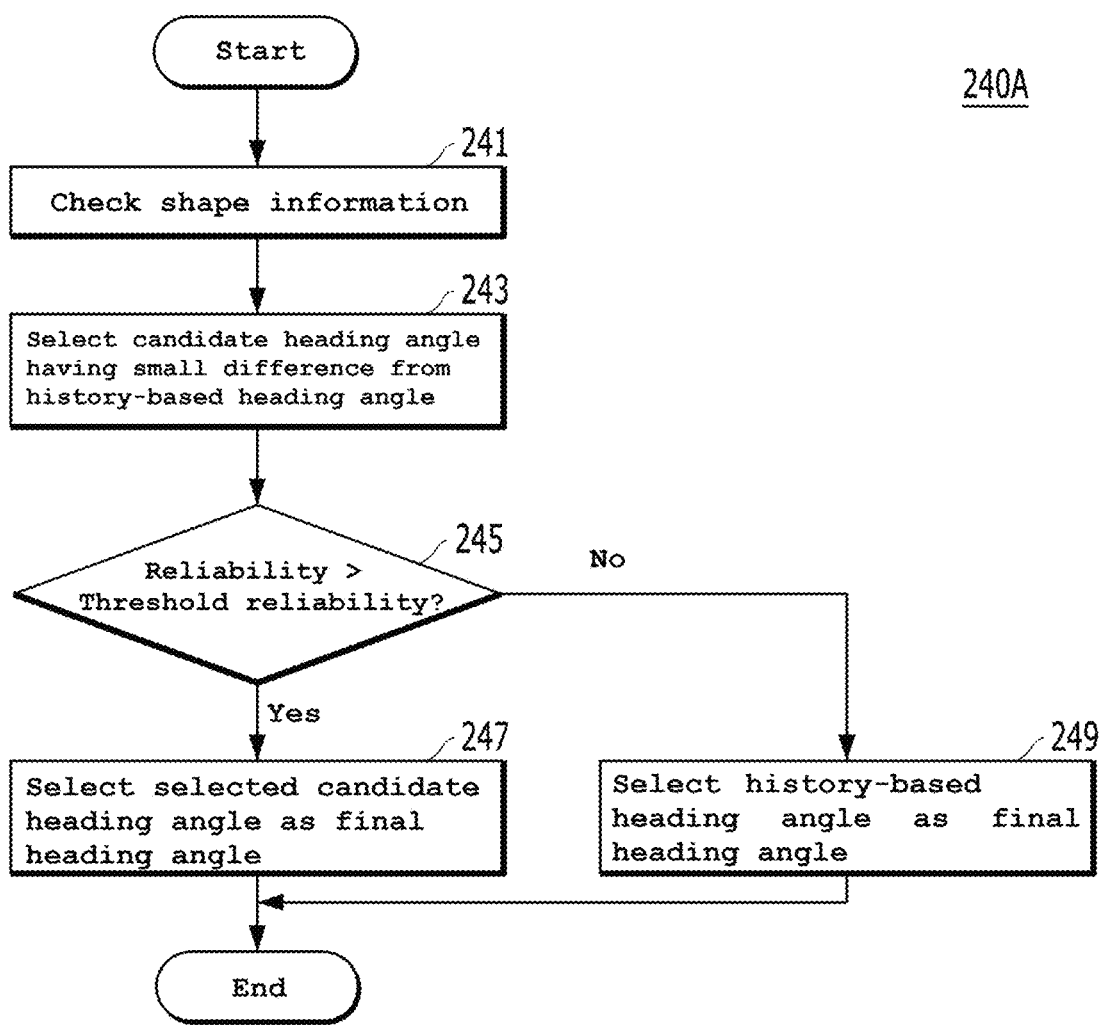
FIG. 9 is a flowchart of an embodiment of step 240 shown in FIG. 2.
Figure 10:
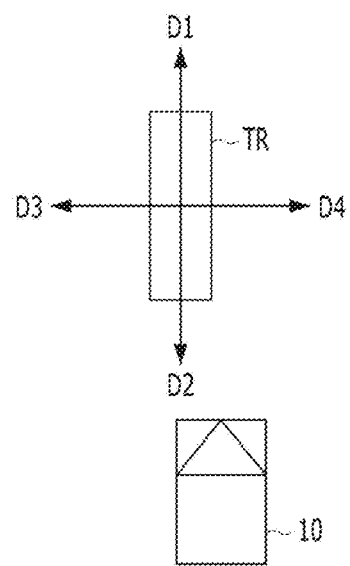
FIG. 10 is a diagram for explaining a candidate heading angle of a track.
Figure 11:
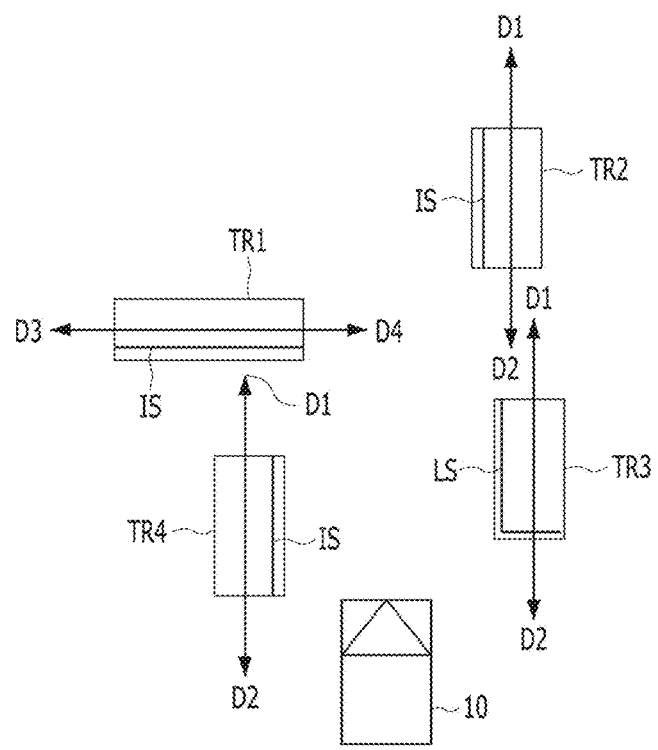
FIG. 11 is a diagram for explaining the candidate heading angle of the track depending on the shape of the track.
Figure 12:
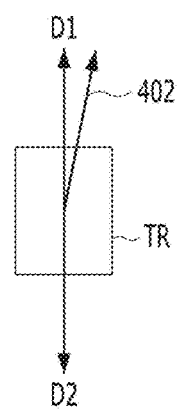
FIG. 12 is a diagram showing a comparison between a candidate heading angle of the track and a history-based heading angle.

FIG. 9 is a flowchart of an embodiment 240A of step 240 shown in FIG. 2. FIGS. 10-12 are diagrams to help understand step 240A shown in FIG. 9. Specifically, FIG. 10 is a diagram for explaining a candidate heading angle of the track TR. FIG. 11 is a diagram for explaining the candidate heading angle of the track TR depending on the shape of the track. FIG. 12 is a diagram showing a comparison between the candidate heading angles D1 and D2 of the track TR and the history-based heading angle 402.

Step 240A shown in FIG. 9 may be performed by the angle correction unit 159 shown in FIG. 3.

After step 230, information about the shape of the track is checked (step 241).

Referring to FIG. 10, one track TR may have a candidate heading angle corresponding to one of four directions D1, D2, D3 and D4 based on the host vehicle 10. When there is no shape information, one track TR has four candidate heading angles D1, D2, D3, and D4, as shown in FIG. 10. In contrast, when shape information is present, one track TR has only two candidate heading angles. For example, referring to FIG. 11, based on the host vehicle 10, the shape of each of first, second, and fourth tracks TR1, TR2, and TR4 is an I-shape IS and the shape of a third track TR3 is an L-shape LS. In this case, each of the second, third, and fourth tracks TR2, TR3, and TR4 has two candidate heading angles D1 and D2 and the first track TR1 has two candidate heading angles D3 and D4.

After step 241, a plurality of candidate heading angles included in shape information and the history-based heading angle are compared with each other to correct the history-based heading angle (steps 243 to 243).

For example, after step 241, a candidate heading angle having a small difference from the history-based heading angle may be selected from among a plurality of candidate heading angles (step 243). For example, as illustrated in FIG. 12, when the shape information has two candidate heading angles D1 and D2, the history-based heading angle 402 and the two candidate heading angles D1 and D2 are compared with each other. In the case shown in FIG. 12, among the two first and second candidate heading angles D1 and D2, the first candidate heading angle D1 has a smaller difference from the history-based heading angle 402 than the second candidate heading angle D2. Thus, the first candidate heading angle D1 may be selected.

Further, after step 243, the candidate heading angle is filtered (e.g. is low-pass filtered) based on the reliability of the selected candidate heading angle (steps 245 to 249). Here, the reliability of the selected candidate heading angle is the reliability of the shape information searched in step 241.

According to the embodiment, whether the reliability is greater than threshold reliability is checked (step 245). For example, a weight of 0 to 1 may be assigned to the reliability and the assigned weight may be checked to inspect the reliability.

If the reliability is greater than the threshold reliability, the candidate heading angle selected in step 243 is determined to be the final heading angle (step 247). However, if the reliability is not greater than the threshold reliability, the history-based heading angle is determined to be the final heading angle (step 249).

Meanwhile, a computer-readable recording medium in which a program for executing the object-tracking method according to the embodiment is recorded may store a program for implementing a function of using the velocity of a track for tracking an object, generated from a point cloud related to the object, in a current recognition period T to obtain a current velocity-based heading angle of the track. The program may also implement, a function of accumulating scores associated with information about the current velocity-based heading angle and incorporating the accumulated scores into a heading history having regions sectioned for respective heading angles of the track. The program may further implement a function of obtaining a history-based heading angle of the track using the heading history. The program may also implement a function of correcting the history-based heading angle using information about the shape of the track and determining the result of correction to be a final heading angle in the current recognition period T.

In addition, the function of obtaining the current velocity-based heading angle of the track may include a function of obtaining an absolute velocity of the track in the current recognition period T. The function of obtaining the current velocity-based heading angle of the track may also include a function of, when the absolute velocity is greater than or equal to a first threshold velocity, obtaining the current velocity-based heading angle using an absolute longitudinal velocity and an absolute lateral velocity, which are components of the absolute velocity. The function of obtaining the current velocity-based heading angle of the track may further include a function of, when the absolute velocity is less than the first threshold velocity, obtaining a difference between a previous velocity-based heading angle obtained using the velocity of the track in the previous recognition period T−1 and a shape-based heading angle obtained using information about the shape of the track in the current recognition period T. The function of obtaining the current velocity-based heading angle of the track may further include a function of, when the difference is less than a threshold difference, determining the shape-based heading angle to be the current velocity-based heading angle. The function of obtaining the current velocity-based heading angle of the track may further include a function of, when the difference is greater than or equal to the threshold difference, checking whether the highest score, among the scores accumulated for each angle in the heading history, is greater than a first threshold score. The function of obtaining the current velocity-based heading angle of the track may further include a function of, when the highest score is greater than the first threshold score, determining the previous velocity-based heading angle to be the current velocity-based heading angle. The function of obtaining the current velocity-based heading angle of the track may also include a function of, when the highest score is less than or equal to the first threshold score, determining the angle of a region having the highest score, among the regions in the heading history, to be the current velocity-based heading angle.

In addition, the function of accumulating scores and incorporating the accumulated scores into the heading history (hereinafter "the function of accumulating and incorporating") may include a function of obtaining a velocity ratio of the velocity having a smaller scalar value among the absolute longitudinal velocity and the absolute lateral velocity, to the velocity having a larger scalar value among the absolute longitudinal velocity and the absolute lateral velocity. The function of accumulating and incorporating may also include a function of checking whether the velocity ratio is less than a reference ratio. The function of accumulating and incorporating may further include a function of, when the velocity ratio is less than the reference ratio, decreasing the score of a target region corresponding to the current velocity-based heading angle, among the regions in the heading history, by a first score, increasing the score by a second score, and increasing the score of each of a left region and a right region, respectively adjacent to the left and the right of the target region, by a third score. The function of accumulating and incorporating may also include a function of, when the velocity ratio is greater than or equal to the reference ratio, decreasing the score of the target region by a fourth score and increasing the score by a fifth score.

In addition, the function of obtaining the history-based heading angle may include a function of, when the highest score is less than or equal to a second threshold score, checking whether the absolute velocity is less than a second threshold velocity. The function of obtaining the history-based heading angle may also include a function of, when the absolute velocity is greater than or equal to the second threshold velocity, determining the current velocity-based heading angle to be the history-based heading angle. The function of obtaining the history-based heading angle may further include a function of, when the absolute velocity is less than the second threshold velocity, checking whether a spacing distance between a region in the heading history into which a score has been incorporated in the previous recognition period T−1 and a region in the heading history into which a score has been incorporated in the current recognition period T is greater than a threshold distance. The function of obtaining the history-based heading angle may further include a function of, when the spacing distance is greater than the threshold distance, determining the angle of the region having the highest score, among regions in the heading history, to be the history-based heading angle. The function of obtaining the history-based heading angle may further include a function of, when the spacing distance is less than or equal to the threshold distance, determining the current velocity-based heading angle to be the history-based heading angle. The function of obtaining the history-based heading angle may further include a function of, when the highest score is greater than the second threshold score and the spacing distance is greater than the threshold distance, determining the angle of the region corresponding to the highest score, among regions in the heading history, to be the history-based heading angle. The function of obtaining the history-based heading angle may also include a function of, when the highest score is greater than the second threshold score and the spacing distance is less than or equal to the threshold distance, determining the current velocity-based heading angle to be the history-based heading angle.

In addition, the function of correcting the history-based heading angle may include a function of checking information about the shape of the track and a function of comparing a plurality of candidate heading angles included in the shape information and the history-based heading angle so as to correct the history-based heading angle.

The computer-readable recording medium includes all kinds of recording devices in which data that may be read by a computer system are stored. Examples of the computer-readable recording medium include a Read-Only Memory (ROM), a Random Access Memory (RAM), a Compact Disk ROM (CD-ROM), a magnetic tape, a floppy disc, and an optical data storage.

The computer-readable recording medium can also be distributed over network-connected computer systems so that the computer-readable code is stored and executed in a distributed fashion. Also, functional programs, code, and code segments for accomplishing the object-tracking method can be easily construed by those, e.g. programmers, having ordinary skill in the art to which the present disclosure pertains.

As is apparent from the above description, according to the method and apparatus for tracking an object and the recording medium storing a program to execute the method according to the embodiments described above, a history-based heading angle is obtained using a history about a heading angle of a track and the history-based heading angle is corrected using shape information. Thus, according to the method and apparatus for tracking an object and the recording medium storing a program to execute the method according to the disclosed embodiments, it is possible to accurately and reliably extract a heading angle by reducing an error in the heading angle and thus to accurately track an object especially in a specific situation, for example, in a situation that when there is a possibility that the velocity is erroneously and suddenly calculated and thus an error is generated in a heading angle, which is extracted based on the velocity, due to low-speed movement of the track or traffic congestion, as well as a situation that the velocity of the track exceeds a predetermined level.

However, the effects achievable through the disclosure are not limited to the above-mentioned effects. Other effects not mentioned herein should be clearly understood by those having ordinary skill in the art from the above description.

The above-described various embodiments may be combined with each other without departing from the scope of the present disclosure unless they are incompatible with each other.

In addition, for any element or process that is not described in detail in any of the various embodiments, reference may be made to the description of an element or a process having the same reference numeral in another embodiment unless otherwise specified.

While the present disclosure has been particularly shown and described with reference to specific embodiments thereof, these embodiments are only proposed for illustrative purposes and do not restrict the present disclosure. It should be apparent to those having ordinary skill in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. A method of tracking an object, the method comprising:
   (a) obtaining a current velocity-based heading angle of a track using a velocity of the track for tracking an object, generated from a point cloud related to the object, in a current recognition period (T);
   (b) accumulating scores associated with information about the current velocity-based heading angle and incorporating the accumulated scores into a heading history having regions sectioned for respective velocity-based heading angles of the track;
   (c) obtaining a history-based heading angle of the track using the heading history; and
   (d) correcting the history-based heading angle using information about a shape of the track and determining a result of correction to be a final heading angle in the current recognition period (T).

2. The method according to claim 1, wherein step (a) comprises:
   obtaining an absolute velocity of the track in the current recognition period (T);
   when the absolute velocity is greater than or equal to a first threshold velocity, obtaining the current velocity-based heading angle using an absolute longitudinal velocity and an absolute lateral velocity, the absolute longitudinal velocity and the absolute lateral velocity being components of the absolute velocity;
   when the absolute velocity is less than the first threshold velocity, obtaining a difference between a previous velocity-based heading angle obtained using a velocity of the track in a previous recognition period (T−1) and a shape-based heading angle obtained using information about the shape of the track in the current recognition period (T);

when the difference is less than a threshold difference, determining the shape-based heading angle to be the current velocity-based heading angle;

when the difference is greater than or equal to the threshold difference, checking whether a highest score, among scores accumulated for each angle in the heading history, is greater than a first threshold score;

when the highest score is greater than the first threshold score, determining the previous velocity-based heading angle to be the current velocity-based heading angle; and when the highest score is less than or equal to the first threshold score, determining an angle of a region having the highest score, among regions in the heading history, to be the current velocity-based heading angle.

3. The method according to claim 2, wherein the absolute velocity is obtained by summing a relative velocity of the track and a velocity of a host vehicle generating the point cloud, and wherein the current velocity-based heading angle is obtained from the absolute longitudinal velocity and the absolute lateral velocity using an arctangent.

4. The method according to claim 2, wherein step (b) comprises:

obtaining a velocity ratio of a velocity having a smaller scalar value to a velocity having a larger scalar value, among the absolute longitudinal velocity and the absolute lateral velocity;

checking whether the velocity ratio is less than a reference ratio;

when the velocity ratio is less than the reference ratio, decreasing a score of a target region corresponding to the current velocity-based heading angle, among regions in the heading history, by a first score, increasing the score by a second score, and increasing a score of each of a left region and a right region, respectively adjacent to a left and a right of the target region, by a third score; and when the velocity ratio is greater than or equal to the reference ratio, decreasing the score of the target region by a fourth score and increasing the score by a fifth score.

5. The method according to claim 4, wherein each of a minimum value and a maximum value that are capable of being accumulated in the heading history is a fixed value.

6. The method according to claim 4, wherein the incorporating the information into the heading history is performed during every recognition period.

7. The method according to claim 5, wherein the incorporating the information into the heading history is performed during every recognition period.

8. The method according to claim 4, wherein scores of regions in the heading history are initialized when the track expires or ends.

9. The method according to claim 5, wherein scores of regions in the heading history are initialized when the track expires or ends.

10. The method according to claim 4, wherein step (c) comprises:

when the highest score is less than or equal to a second threshold score, checking whether the absolute velocity is less than a second threshold velocity;

when the absolute velocity is greater than or equal to the second threshold velocity, determining the current velocity-based heading angle obtained in step (a) to be the history-based heading angle;

when the absolute velocity is less than the second threshold velocity, checking whether a spacing distance between a region in the heading history into which a score has been incorporated in the previous recognition period (T−1) and a region in the heading history into which a score has been incorporated in the current recognition period (T) is greater than a threshold distance;

when the spacing distance is greater than the threshold distance, determining an angle of a region having the highest score, among regions in the heading history, to be the history-based heading angle;

when the spacing distance is less than or equal to the threshold distance, determining the current velocity-based heading angle obtained in step (a) to be the history-based heading angle;

when the highest score is greater than the second threshold score and the spacing distance is greater than the threshold distance, determining an angle of a region corresponding to the highest score, among regions in the heading history, to be the history-based heading angle; and when the highest score is greater than the second threshold score and the spacing distance is less than or equal to the threshold distance, determining the current velocity-based heading angle obtained in step (a) to be the history-based heading angle.

11. The method according to claim 2, wherein the heading history comprises a plurality of regions and a number of the plurality of regions is as follows:

$$N = \frac{360°}{x°}$$

where N represents the number of the plurality of regions and is a positive integer of 2 or more and x° represents an angular range of each of the plurality of regions.

12. The method according to claim 10, wherein the heading history comprises a plurality of regions and a number of the plurality of regions is as follows:

$$N = \frac{360°}{x°}$$

where N represents the number of the plurality of regions and is a positive integer of 2 or more and x° represents an angular range of each of the plurality of regions.

13. The method according to claim 11, wherein the angle of the region having the highest score is an intermediate angle in an angular range of the region having the highest score.

14. The method according to claim 10, wherein step (d) comprises:

checking information about the shape of the track; and correcting the history-based heading angle by comparing a plurality of candidate heading angles included in the information about the shape with the history-based heading angle.

15. The method according to claim 14, wherein the correcting comprises:

selecting a candidate heading angle having a small difference from the history-based heading angle from among the plurality of candidate heading angles.

16. The method according to claim 15, wherein the correcting further comprises:
  filtering the candidate heading angle based on a reliability of the selected candidate heading angle.

17. The method according to claim 16, wherein the filtering comprises:
  checking whether the reliability is greater than a threshold reliability,
  wherein step (d) includes
    when the reliability is not greater than the threshold reliability, determining the history-based heading angle to be the final heading angle, and
    when the reliability is greater than the threshold reliability, determining the selected candidate heading angle to be the final heading angle.

18. An apparatus for tracking an object, the apparatus comprising:
  a track generation unit configured to generate a track for tracking an object from a point cloud related to the object;
  an angle calculation unit configured to calculate a current velocity-based heading angle of the track using a velocity of the track in a current recognition period (T);
  a history unit configured to accumulate scores associated with information about the current velocity-based heading angle and to incorporate the accumulated scores into a heading history having regions sectioned for respective velocity-based heading angles of the track;
  an angle extraction unit configured to extract a history-based heading angle of the track using the heading history; and
  an angle correction unit configured to correct the history-based heading angle using information about a shape of the track and to output a result of correction as a final heading angle in the current recognition period (T).

19. A computer-readable non-transitory medium storing a computer-readable program for implementing a method of tracking an object, the method comprising:
  obtaining a current velocity-based heading angle of a track using a velocity of the track for tracking an object, generated from a point cloud related to the object, in a current recognition period (T);
  accumulating scores associated with information about the current velocity-based heading angle and incorporating the accumulated scores into a heading history having regions sectioned for respective velocity-based heading angles of the track;
  obtaining a history-based heading angle of the track using the heading history; and
  correcting the history-based heading angle using information about a shape of the track and determining a result of correction to be a final heading angle in the current recognition period (T).

* * * * *